July 2, 1957 A. L. LE FEBVRE ET AL 2,797,968
CONNECTING DEVICE
Filed Nov. 24, 1954 2 Sheets-Sheet 1

INVENTOR.
Alfred L. LeFebre, Alvin A. Johnson and
BY Douglas M. Small.

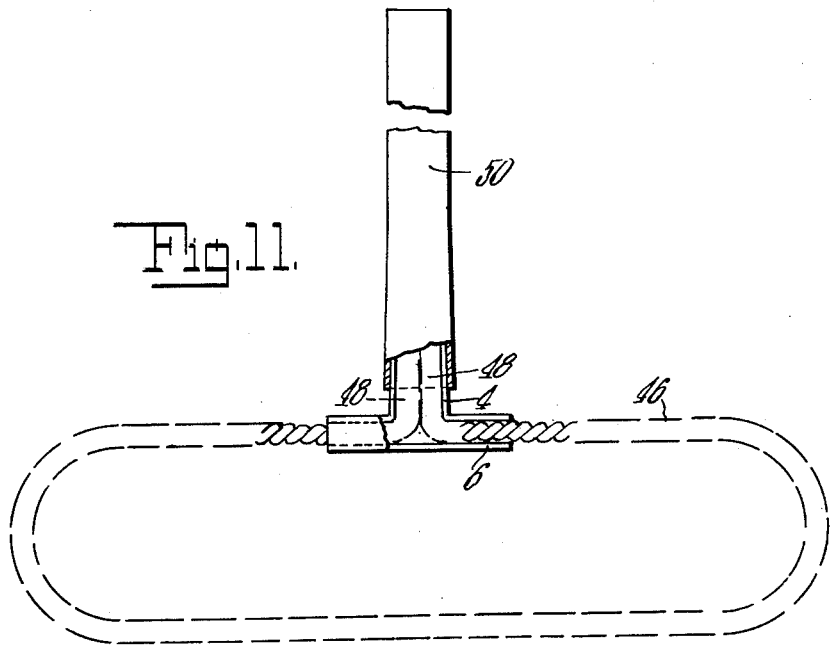
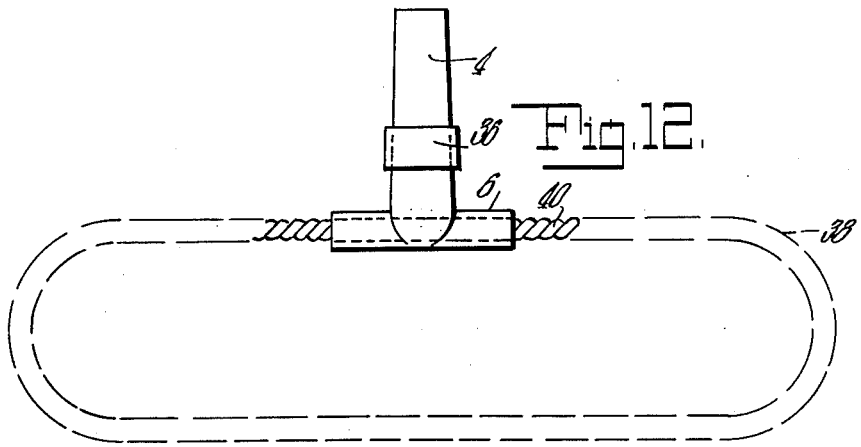

United States Patent Office 2,797,968
Patented July 2, 1957

2,797,968

CONNECTING DEVICE

Alfred L. Le Febvre, Southwick, Alvin O. Johnson, Westfield, and Douglas M. Small, Springfield, Mass., assignors to Stanley Home Products, Inc., Easthampton, Mass., a corporation of Massachusetts Application November 24, 1954, Serial No. 470,988

1 Claim. (Cl. 306—19)

This invention relates to a connecting device for connecting handles to brushes, brooms, mops and the like.

The principal object of the invention is the provision of a connector which is simple in form, so as to be economically manufactured, and which is unitary in form and devoid of loose parts, such as screws, springs, nuts and the like.

According to one novel feature of the invention, the connector is so constructed that it may be readily attached to the frame of a brush, mop or the like, by securing the handle to the connector.

According to another novel feature of the invention, the connector may be secured to the frame of a brush, mop or the like for shipping, storage and other purposes and packaged along with the handle which may be screwed to the connector by the user or purchaser of the package.

According to a further novel feature of the invention, the connector may be swivelly associated with the frame of a brush, mop or the like or said connector may be so associated with a frame as to retard free, relative movements thereof.

All of the above cited objects, we accomplish by means of such structure and relative arrangement of parts thereof, as will fully appear by a perusal of the description below and by various specific features which will be hereinafter set forth.

To these above and other ends and with the foregoing and various other and ancillary features and advantages and objects of our invention as will become more readily apparent as the description proceeds, our invention consists in certain features of novelty, in a mode of operation, and in the combination, organization, and arrangement of parts as will be hereinafter more particularly pointed out in the claim hereunto annexed and more fully described and referred to in conjunction with the accompanying drawings wherein:

Figs. 4 and 5 are views similar to Figs. 1 and 2 showing another form of the connector;

Fig. 9 is a sectional view on the line 9—9 of Fig. 8;

Fig. 10 is a view similar to Fig. 8 showing another form of the invention;

Fig. 11 is a front elevational view of the connector and handle of the invention associated with a frame of a brush or the like; and Fig. 12 is a view similar to Fig. 11 showing the connector associated with a frame of a brush or the like.

Figure 1:
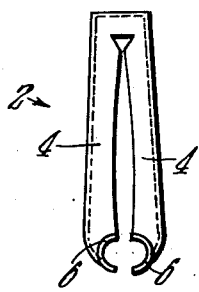
Figs. 1 and 2 are side and front elevational views of a connnector embodying the novel features of the invention.

Referring now to the drawings more in detail the invention will be fully described.

Figure 2:
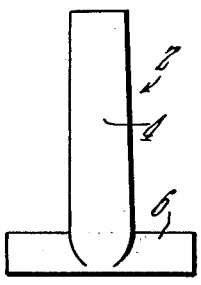
Figure 3:
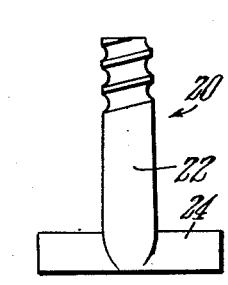
Fig. 3 is a side elevational view of the connector shown in Fig. 1 with the end of a handle connected thereto.

A connector 2, shown in Figs. 1 and 2, is formed to have side runs or arms 4 which are connected at upper ends. The connector, in all cases, will preferably be formed from sheet metal by stamping and various forming operations.

Channels 6 extend transversely outwardly from lower ends of the side arms, as shown.

In transverse cross section, the side arms 4 are of cup shape and longitudinal inner edges of the arms are slightly concave as indicated.

The connector is in open position in Fig. 1 and outer sides of the arms converge upwardly from the channels 6 so that the connector is tapering.

The channels are in open position and there is a sufficient yieldability of the arms to permit the frame of a brush, mop or the like being inserted therein.

A handle 8 of thin walled tubing is shown at 8, the lower end 10 of which is pressed downwardly over the connector. The end of the tubing closes the arms to close the channels on the frame. The handle will have walls sufficiently thin as to yield slightly and the connector is so formed that the arms yield to some extent so that, with the taper of the connector, it becomes wedged in the handle.

Figure 4:
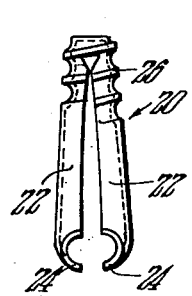
Figure 3:
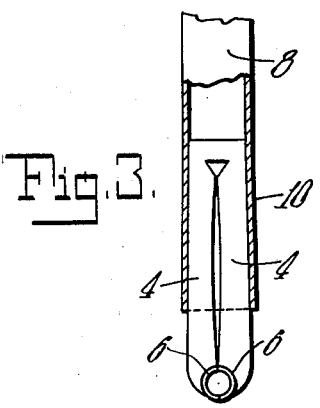

The connector 20 of Figs. 4 and 5 is similar to that already described, being formed from sheet metal by suitable operations.

Like the connector 2, this connector has channels 24 at the lower ends of side arms 22, which arms are connected at the upper end of the connector.

The connector 20 is generally tapering as is the connector 2 and is provided at the upper portion with a thread indicated by 26.

The lower end 28 of a handle 30 which is formed from thin walled tubing is provided with one or more portions 32 displaced inwardly for engaging between the threads of the screw thread.

The arms are slightly yieldable, as is the lower end of the handle, so that, as the handle is screwed onto the connector, the yieldability and taper of the connector causes the handle to jam or wedge on the connector against unwanted displacement therefrom.

Figure 7:
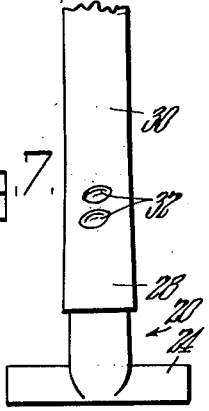
Fig. 7 is a front elevational view of the connector and handle shown in Fig. 6.
Figure 6:
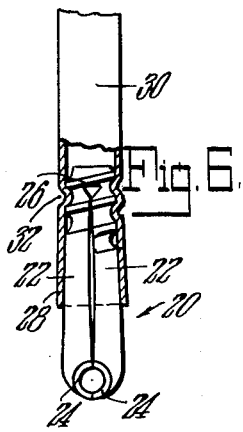
Fig. 6 is a view similar to Fig. 3 showing the end of a handle secured to the connector of Figs. 4 and 5.

Figs. 6 and 7 show the screw type connector and handle in connected relation with the channels closed.

Either the connector 2 or connector 20 may be arranged so that a frame part of a brush or the like is swivelled in the channels. The said frame may be frictionally engaged by the channels to provide controlled movement of the frame and handle or the frame may be held fast in the channels.

In some cases, it may be desired to secure a connector to a frame of a brush or the like so that the frame may be stored or shipped as a unit along with a handle to be assembled with the unit by the user.

Figure 8:
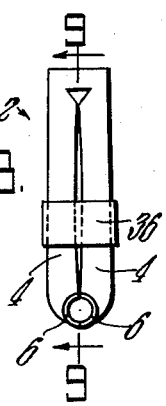
Fig. 8 is a side elevational view of the connector of Fig. 1 having a retaining ring thereon.

To close the arms so that the channels close on a portion of a brush frame, a ring or band 36 is pressed down on the connector to close the arms and channels as in Figs. 8 and 9.

A frame 38 is shown in Fig. 12 wherein a portion 40 is disposed in the channels 6 which are held in closed position by action of the band 36.

Connector 20 may likewise be closed by a ring or band 42 so that the channels embrace a frame portion.

With either connector, the frame part may be rigidly held by the channels, and it may be frictionally held or may be swivelled in the channels.

As stated, a brush, mop or the like may be stored and shipped with a connector associated with the frame thereof and subsequently a handle may be assembled on the connector as described.

In some cases, as indicated in Fig. 11, a frame 46 may have end portions 48 which extend into the channels and upwardly in the connector.

The channels may be closed by a ring or band, previously described, or the connector may be closed by a handle 50 in engagement with the connector of Figs. 1 and 2 or that of Figs. 4 and 5.

While we have illustrated and described the invention as embodied in a specific arrangement, we do not intend to be limited to the details shown since various modifications and structural changes may be made without departing in any way from the spirit of the invention.

Without further analysis, the foregoing will so fully reveal the gist of our invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalency of the claim below.

What it is desired to claim and secure by Letters Patent of the United States is:

A unitary device for connecting the lower end of a tubular handle to an elongated frame part of a brush or the like comprising, a pair of elongated thin walled vertically disposed side arms and pairs of elongated and straight thin walled lower channels extending outwardly horizontally in opposite directions from lower ends of the side arms, said side arms of the pair thereof and channels of the pairs thereof being semi-circular in cross section having longitudinal side edges of said pairs innermost, hinged connections between upper ends of the side arms arranged for movement of the side arms and channels of the pairs thereof between a normally open frame receiving position and a closed frame embracing position of the channels of the pairs thereof wherein the longitudinal edges of the channels of the pairs thereof are in abutment, said side arms converging upwardly from said channels and being provided with screw thread means externally thereof for screwing into the end of a hollow handle, the inner longitudinal edges of the side arms of the pair thereof being slightly spaced intermediate upper and lower ends thereof whereby as said side ams are screwed into the end of a hollow handle said arms may yield towards one another for a wedging action in the handle and the inner edges of the channels of the pairs thereof brought into abutment.

References Cited in the file of this patent
UNITED STATES PATENTS

| | | |
|---|---|---|
| 882,423 | Saloman | Mar. 17, 1908 |
| 1,948,212 | Halperyn | Feb. 20, 1934 |
| 2,141,336 | Bailey | Dec. 27, 1938 |